United States Patent
Cunningham et al.

(10) Patent No.: US 9,054,794 B2
(45) Date of Patent: *Jun. 9, 2015

(54) DETECTING FAULTS AFFECTING COMMUNICATIONS LINKS

(71) Applicant: Broadcom Corporation, Irvine, CA (US)

(72) Inventors: Christopher Cunningham, Belmont, MA (US); Jianming Zhu, North Billerica, MA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,710

(22) Filed: May 23, 2014

(65) Prior Publication Data

US 2014/0269876 A1   Sep. 18, 2014

Related U.S. Application Data

(63) Continuation of application No. 14/092,484, filed on Nov. 27, 2013, now Pat. No. 8,743,938, which is a continuation of application No. 13/128,049, filed as application No. PCT/US2009/065740 on Nov. 24, 2009, now Pat. No. 8,611,405.

(60) Provisional application No. 61/200,066, filed on Nov. 24, 2008.

(51) Int. Cl.
   *H04B 3/46* (2006.01)
   *H04B 17/00* (2006.01)
   (Continued)

(52) U.S. Cl.
   CPC .................. *H04B 17/00* (2013.01); *H04B 3/48* (2013.01); *H04L 12/2898* (2013.01);
   (Continued)

(58) Field of Classification Search
   CPC ..... H04M 3/304; H04M 3/306; H04M 3/085;
   H04M 2201/12; H04B 17/00; H04B 3/48;
   H04L 41/0631; H04L 41/0677; H04L 12/2898; H04L 2012/6478
   USPC .................... 379/22.03, 22.08, 23, 24, 32.04; 375/222, 224, 225, 227, 316
   See application file for complete search history.

(56) References Cited

U.S. PATENT DOCUMENTS 6,289,057 B1   9/2001   Velez et al.
6,785,292 B1   8/2004   Vogel
(Continued)

FOREIGN PATENT DOCUMENTS

| EP | 1349355 | 10/2003 |
|---|---|---|
| WO | WO 2007/130877 | 11/2007 |
| WO | WO 2008/016585 | 2/2008 |

OTHER PUBLICATIONS

ANSI T1.413-1998, "Network and Customer Installation Interfaces Asymmetric Digital Subscriber Line (ADSL) Metallic Interface," Draft American National Standard for Telecommunications, 1998, 270 pages.

(Continued)

*Primary Examiner* — Rahel Guarino
(74) *Attorney, Agent, or Firm* — Oblon, McClelland, Maier & Neustadt, L.L.P.

(57) ABSTRACT

A modem or associated computing or testing device is configured to detect the presence of one or more faults that affect DSL communications, and upon their detection, generate, for example, an indication, communication or message that recommends corrective action. In this context, a fault is generally caused by one or more unfiltered devices, impulsive noises, malfunctioning modems, or other factor that does not affect measured attenuation or measured noise, but does affect the signal-to-noise ratio (SNR) of the link. In addition to being able to generate a message guiding a user through corrective action, the system can estimate the rate impact of the detected fault.

14 Claims, 7 Drawing Sheets

(51) Int. Cl.
  H04B 3/48     (2006.01)
  H04L 12/24    (2006.01)
  H04M 3/08     (2006.01)
  H04M 3/30     (2006.01)
  H04L 12/28        (2006.01)
  H04L 12/64        (2006.01)

(52) U.S. Cl.
  CPC .... *H04L 2012/6478* (2013.01); *H04L 41/0631* (2013.01); *H04L 41/0677* (2013.01); *H04M 3/085* (2013.01); *H04M 3/304* (2013.01); *H04M 3/306* (2013.01); *H04M 2201/12* (2013.01)

(56) References Cited

U.S. PATENT DOCUMENTS

| | | | |
|---|---|---|---|
| 7,711,530 | B2 | 5/2010 | Cioffi et al. |
| 8,611,405 | B2 * | 12/2013 | Cunningham et al. ........ 375/222 |
| 8,743,938 | B2 * | 6/2014 | Cunningham et al. ........ 375/227 |
| 2001/0040918 | A1 | 11/2001 | Krinsky et al. |
| 2005/0041753 | A1 | 2/2005 | Cunningham |
| 2006/0098725 | A1 | 5/2006 | Rhee et al. |
| 2009/0323903 | A1 | 12/2009 | Cioffi et al. |

OTHER PUBLICATIONS

"IEEE 802.11: Wireless LAN Medium Access Control (MAC) and Physical Layer (PHY) Specifications" Jun. 2007; 1233 pages.
"IEEE 802.16: Air Interface for Fixed Broadband Wireless Access Systems" Oct. 2004; 895 pages.
ITU Recommendation G992.1, "Asymmetric digital subscriber line (ADSL) transceivers," International Telecommunication Union, Jun. 1999, 256 pages.
ITU-T Recommendation G.992.3, "Asymmetric digital subscriber line transceivers 2 (ADSL2)," International Telecommunication Union, Jan. 2005, 436 pages.
ITU-T Recommendation G.992.5, "Asymmetric Digital Subscriber Line (ADSL) transceivers—Extended bandwidth ADSL2 (ADSL2+)," International Telecommunication Union, May 2003, 92 pages.
ITU-T Recommendation G.993.2, "Very high speed digital subscriber line transceivers 2 (VDSL2)," International Telecommunication Union, Feb. 2006, 252 pages.
International Search Report for International (PCT) Patent Application No. PCT/US2009/065740, mailed Feb. 11, 2010.
Written Opinion for International (PCT) Patent Application No. PCT/US2009/065740, mailed Feb. 11, 2010.
International Preliminary Report on Patentability for International (PCT) Patent Application No. PCT/US2009/065740, mailed Jun. 3, 2011.
Official Communication for European Patent Application No. 09760432.6, dated Jun. 29, 2011.
Official Action for European Patent Application No. 09760432.6, dated Mar. 22, 2013.
Official Action for U.S. Appl. No. 13/128,049, mailed Nov. 28, 2012.
Official Action for U.S. Appl. No. 13/128,049, mailed Jul. 22, 2013.
Notice of Allowance for U.S. Appl. No. 13/128,049, mailed Sep. 4, 2013.
Official Action for U.S. Appl. No. 14/092,484 mailed Jan. 16, 2014.
Notice of Allowance for U.S. Appl. No. 14/092,484 mailed Mar. 4, 2014.

* cited by examiner

DETECTING FAULTS AFFECTING COMMUNICATIONS LINKS

RELATED APPLICATION DATA

This application is a Continuation of U.S. patent application Ser. No. 14/092,484, filed Nov. 27, 2013, now U.S. Pat. No. 8,743,938, which is a Continuation of U.S. patent application Ser. No. 13/128,049, filed Aug. 10, 2011, now U.S. Pat. No. 8,611,405, which is a National Stage Application under 35 U.S.C. 371 of PCT Application No. PCT/US2009/065740, having an international filing date of Nov. 24, 2009, which designated the United States, which claims the benefit of and priority under 35 U.S.C. §119(e) to U.S. Patent Application No. 61/200,066, filed Nov. 24, 2008, entitled "Methods and Systems for Detecting Faults Affecting Communications Links," which is incorporated herein by reference in its entirety.

FIELD OF THE INVENTION

One exemplary purpose of certain embodiments of this invention is to detect the presence of one or more faults that affect DSL communications, and upon their detection, generate, for example, a message that recommends corrective action. In this context, a fault is one or more unfiltered devices, impulsive noises, malfunctioning modems, or something else that does not affect measured attenuation or measured noise but does affect the signal-to-noise ratio of the link.

BACKGROUND

Some of the most problematic aspects of Digital Subscriber Line (DSL) communications are faults including but not limited to the following:

The presence of unfiltered devices connected to the telephone line such as telephones, answering machines, fax machines and in general and device connected to the telephone line. Many of these devices impose nonlinear behavior on transmitted signals. Harmonic frequencies arising from these nonlinearities generate a disturbance that is often the dominant noise source limiting data rates and loop reach.

The presence of impulsive noise.

A malfunctioning modem on either or both ends of the line.

Unlike other faults such as high crosstalk, AM ingress, and bridged taps, the above faults are not always identifiable by doing a separate analyses of the attenuation (HLOG) and quiet line noise (QLN) vectors as a function of frequency (per subchannel) that are available as a part of standard-compliant DSL links.

For example, high crosstalk or AM can be identified by analyzing QLN, and bridged taps can be identified by analyzing HLOG. Analyzing these vectors separately in isolation cannot always uncover problems such as nonlinear effects (caused by unfiltered devices), intermittent effects that occur when the measurement is not in progress (such as impulsive noise), or problems with the modems themselves.

SUMMARY

One exemplary purpose of this invention is to detect the presence of one or more of the above types of faults (without necessarily being able to discriminate between them) affecting DSL communications. Upon their detection, a message can be generated that recommends corrective action.

Furthermore, another exemplary purpose of this invention is to estimate the rate impact of the detected fault.

One aspect of the invention is to detect the presence of one or more faults that affect DSL communications, and upon their detection, generate, for example, an indication, communication or message that recommends corrective action. In this context, a fault is generally caused by one or more unfiltered devices, impulsive noises, malfunctioning modems, any non-linearity on the line, any noise source that is not present when the SNR is measured, or any or other factor that does not affect measured attenuation or measured noise, but does affect the signal-to-noise ratio (SNR) of the link.

Additional aspects of the invention relate to multi-carrier communications links, such as discrete multi-tone (DMT). One exemplary method may use standard-compliant links (i.e., as specified in published DSL standards such as ITU-T G.992.3/5 and G.993.2, which are incorporated herein by reference in their entirety), but it is not restricted to standard compliant links. Other embodiments of this invention can apply to single-carrier communications links. The individual carriers used for the link will be referred to as "subchannels." For a multi-carrier communications system, there will be multiple subchannels, whereas for a single-carrier communications system there would be only one subchannel. Generally, each link is full duplex, including both an upstream (US) direction and a downstream (DS) direction. To simplify the following descriptions, it should be understood that all analyses can be performed for upstream signals, downstream signals, and/or both. Typically, a power spectral density (PSD) is transmitted in both directions during a communications link.

For standard compliant DSL links (as well as some non-standard DSL links), it is possible to observe the signal-to-noise ratios (SNRs) for each of the upstream and/or downstream subcarriers used for the link. For recent ITU DSL standards (ADSL2/2+, VDSL2, G.inp, etc.), this can be accomplished if the link is performed in the Loop Diagnostics Mode as defined by ITU standards for DSL, or alternatively the SNRs can be read from the MIB (Management Interface) by using a messaging channel during Showtime, which is term used to denote the steady-state data transmission mode for DSL. If SNRs are not available (such as with ITU G992.1 and T1.413 ADSL standards), then the bit allocations per subcarrier, fine gain allocations per subcarrier, and the average SNR margin may be used to estimate the SNR per subcarrier.

For standard compliant DSL links (as well as some non-standard DSL links), it is also possible to observe the attenuation for each of the upstream and/or downstream subchannels used for the link. For recent ITU DSL standards (ADSL2, /2+, VDSL2, G.inp, etc.), this can be accomplished if the link is performed in the Loop Diagnostics Mode as defined by ITU standards for DSL, or alternatively the attenuation can be read from the MIB by using a messaging channel during Showtime, which is term used to denote the steady-state data transmission mode for DSL. For recent ITU DSL standards, the parameter HLOG is used to denote the magnitude of the attenuation per subchannel. If attenuation is not available for each subchannel separately such as with HLOG, then often composite channel attenuation is available across multiple subchannels. For most DSL standards, the parameters LATN or SATN can be used to determine the channel attenuation with sufficient accuracy.

For standard compliant DSL links (as well as some non-standard DSL links), it is further possible to observe the noise for each of the upstream and/or downstream subchannels used for the link. For recent ITU DSL standards (ADSL2, /2+, VDSL2, G.inp, etc.), this can be accomplished if the link is performed in the Loop Diagnostics Mode as defined by ITU standards for DSL, or alternatively the noise can be read from the MIB by using a messaging channel during Showtime, which is term used to denote the steady-state data transmission mode for DSL. For recent ITU DSL standards, the parameter Quiet Line Noise (QLN) is used to denote the magnitude of the noise per subchannel.

Another aspect of the invention is further directed toward observing whether the per-subchannel SNR measured by the modems differs significantly from the modeled per-subchannel SNR derived from the per-subchannel QLN measurement, per-subchannel HLOG measurement, knowledge of the PSD profile and other link settings, and knowledge about the behavior of the modem that can be characterized ("calibrated") in advance. If a significant difference exists between the measured and modeled per-subchannel SNRs, then a fault can be inferred such as one of the faults listed above.

One exemplary aspect includes of the following steps:
1. Initiate a link via, for example, a management interface. Wait for the link to succeed. If the link fails, then the proposed method may not be able to be applied.
2. Record and/or request and/or read and/or receive via a management interface (e.g. MIB) the measured per-subchannel SNRs, measured per-subchannel HLOG, measured per-subchannel QLN, and information describing the link such as transmit PSD, DSL standard and link parameters.
3. Determine the modeled per-subchannel SNR from the measured HLOG, measured QLN, transmit PSD (TxPSD), and known modem behavior.

One exemplary approach for determining the modeled SNR is as follows:

$$ModeledSNR = (TxPSD * HLOG)/(QLN + IntrinsicNoise),$$

where TxPSD, HLOG, and QLN are each understood to be given on a per-subchannel basis, and IntrinsicNoise is a per-subchannel noise model that encapsulates the noise arising from the modems (e.g., thermal noise floors) and signal propagation and processing (e.g., intersymbol interference, echo, and quantization effects).

Note that IntrinsicNoise is generally dependent upon HLOG, QLN, and the modem types. It can be characterized in advance of the system being deployed and pre-stored for use when the system is operational. One exemplary brute-force approach to implementing the intrinsic noise model is simply to construct a lookup table for each condition that could be encountered in the field. Alternatively, one or more models can be constructed to approximate the behavior of IntrinsicNoise for different combinations of conditions. Alternatively, or in addition, a simple approximate model of the intrinsic noise, such as white noise, may be used in some cases. The effects of intrinsic noise may be neglected if they are insignificant relative to the QLN.

Also note that pre-stored correction factors may need to be applied to the HLOG and QLN vectors prior to using them in the above expression. These corrections also can be determined in advance and pre-stored.

4. By comparing the measured SNR and the modeled SNR over a range of subchannels that are known to be sufficiently accurate, a determination is made regarding whether the detectable fault types listed above are present. This usually occurs when the modeled SNR is significantly higher than the measured SNR, indicating that something present in the measurement (e.g., nonlinearity) is not being taken into account by the models. One exemplary approach for comparing the measured and modeled SNR to decide whether a fault is present would be to determine whether the following inequality is true:

$$MeasuredSNR/ModeledSNR < SNRThreshold,$$

where SNRThreshold is some reasonable ratio that allows for modeling and measurement errors to occur without a tolerable rate of false fault detections and missed fault detections.
5. It is reported to, for example, the user (and optionally one or more other entities) whether a fault is detected, a fault is known not to be present, or whether a determination cannot be made because the known inaccuracies of the system could alone cause the above inequality to be true. A confidence metric may also be reported to the user and/or the one or more other entities indicating the extent to which the reported outcome is likely to correspond to reality.
6. The attainable data rate from the measured SNR can be determined and subtracted from the attainable data rate determined from the modeled SNR, resulting in the rate impact from any fault that was detected. The rate estimates can be determined using any one of several link assumptions including the actual link parameters used to obtain the measured SNRs. In fact, the actual link data rate could be used directly instead of determining the data rate from the measured SNRs. This rate impact from the fault can be reported to the user and/or one or more other entities.

The above analysis for determining the presence of the fault may optionally be performed on the SNR values in aggregate using some weighted combination.

The above analysis for determining the presence of the fault may optionally be performed for the resulting data rates obtainable by the SNR values.

As an alternative to performing the analysis using SNR values, the analysis may be performed by estimating the additive noise apparently attributable to the fault (denoted FaultNoise), which can be inferred from the SNR values by assuming knowledge of the other noises and the received signal. For example, another exemplary method would replace steps 3 and 4 above with the following steps:

3. Determine the additive noise apparently attributable to the fault from the measured SNR, measured HLOG, measured QLN, transmit PSD, and known modem behavior. One exemplary approach for determining noise attributable to the fault is as follows:

$$FaultNoise = (TxPSD * HLOG)/MeasuredSNR - QLN - IntrinsicNoise$$

4. By considering the magnitude of the FaultNoise relative to the other noises (QLN+IntrinsicNoise), a determination is made regarding whether the detectable fault types listed above are present. One exemplary approach for comparing the FaultNoise and other noises (QLN+IntrinsicNoise) to decide whether a fault is present would be to determine whether the following inequality is true:

$$FaultNoise/(QLN + IntrinsicNoise) > FaultNoiseThreshold,$$

where FaultNoiseThreshold is some reasonable differential that allows for modeling and measurement errors to occur without a tolerable rate of false fault detections and missed fault detections.

As an alternative to performing the analysis using SNR values, the analysis may be performed by estimating the attenuation apparently attributable to the fault (denoted FaultAttenuation), which can be inferred from the SNR values by assuming knowledge of the noise values, transmitted PSD, and the received signal. For example, another exemplary method would replace steps 3 and 4 above with the following steps:

3. Determine the attenuation apparently attributable to the fault from the measured SNR, measured HLOG, measured QLN, transmit PSD, and known modem behavior. One exemplary approach for determining fault attenuation is as follows:

FaultAttenuation=MeasuredSNR*(QLN+Intrinsic-Noise)/(TxPSD*HLOG)

4. By considering the magnitude of the FaultAttenuation, a determination is made regarding whether the detectable fault types listed above are present. This usually occurs when the FaultAttenuation is significantly lower than the value one. One exemplary approach for considering the FaultAttenuation to decide whether a fault is present would be to determine whether the following inequality is true:

FaultAttenuation<FaultAttenuationThreshold, where FaultAttenuationThreshold is some reasonable differential that allows for modeling and measurement errors to occur without a tolerable rate of false fault detections and missed fault detections.

Note that the above formulation of FaultAttenuation can be rewritten as follows:

FaultAttenuation=MeasuredSNR/ModeledSNR, which can be compared directly with SNRThreshold. Therefore, FaultAttenuation analysis is equivalent to comparing the modeled and measured SNRs.

As another alternative to performing the analysis using SNR values, the analysis may be performed by estimating the noise amplification apparently attributable to the fault (denoted NoiseAmplification), which can be inferred from the SNR values by assuming knowledge of the noise values, transmitted PSD, and the received signal. For example, an exemplary method would replace steps 3 and 4 above with the following steps:

3. Determine the noise amplification apparently attributable to the fault from the measured SNR, measured HLOG, measured QLN, transmit PSD, and known modem behavior. One exemplary approach for computing noise amplification is as follows:

NoiseAmplification=(TxPSD*HLOG)/(MeasuredSNR*(QLN+IntrinsicNoise))

4. By considering the magnitude of the NoiseAmplification, a determination is made regarding whether the detectable fault types listed above are present. This usually occurs when the NoiseAmplification is significantly lower than the value one. One exemplary approach for considering the NoiseAmplification to decide whether a fault is present would be to determine whether the following inequality is true:

NoiseAmplification<NoiseAmplificationThreshold, where NoiseAmplificationThreshold is some reasonable differential that allows for modeling and measurement errors to occur without a tolerable rate of false fault detections and missed fault detections.

Note that the above formulation of NoiseAmplification can be rewritten as follows:

NoiseAmplification=ModeledSNR/MeasuredSNR, which can be compared with 1/SNRThreshold. Therefore, NoiseAmplification analysis is equivalent to comparing the modeled and measured SNRs.

For links initiated as a part of the exemplary method, link settings usually should be set to maximize the probability that relevant data can be collected. For example, because it may not be necessary to remain in Showtime for any extended period of time, the required SNR margin often can be set very low. Similarly, it may be advantageous to not set a minimum data rate requirement beyond any imposed by the standard or modem implementations. By allowing links to occur with fewer constraints, the exemplary method can potentially link and acquire data on more "difficult" lines (e.g., longer lines and/or lines that contain higher noise).

Each time that the steps described above are exercised, the presence of a fault can be detected. If the presence of a harmful unfiltered device is detected, it cannot be determined (using only the above steps) exactly how many faults are present.

To accomplish this, the user is instructed to first identify, locate and remove at least one fault condition and then repeat the above steps. This process can be iterated until there are no more faults detected. This iterative process allows the user to determine how many harmful unfiltered devices are present on the line. Different approaches may be used to identify and locate the specific fault. Discriminating between these different fault types is beyond the scope of this idea.

A confidence metric can be formulated that quantifies the extent to which it is known that a fault is present on the line. This can be formulated in terms of a probability given the information that is known, or some other metric that is informative to the user.

Note that the proposed method can be used as a form of "domain location," which is to say that it narrows down the probability that a particular problem occurs within some part of the network (e.g., inside the customer premises, inside the central office, or in the cables in the field). Given that a fault is detected, the probability that the fault occurs in a specific domain can be conditioned on information about the prevalence of unfiltered devices, impulse noise, malfunctioning hardware, etc.

Furthermore, if the fault is detected only in the downstream data, but not in the upstream data, then additional information can be inferred about the location of the fault. A similar argument would apply if the fault is detected only in the upstream data, but not in the downstream data, if the fault is detected in both locations, or in neither location.

Exemplary, non-limiting aspects of the invention include one or more of the following:
1. A module capable of detecting the presence of a fault by comparing the modeled SNR with the measured SNR for a given link, wherein the modeled SNR is derived from one or more of the measured HLOG, measured QLN, transmit PSD, DSL standard, link parameters, and known modem behavior, and the measured SNR is reported by a modem.
2. A method for detecting the presence of a fault comprising: comparing the modeled SNR with the measured SNR for a given link, wherein the modeled SNR is derived from one or more of the measured HLOG, measured QLN, transmit PSD, DSL standard, link parameters, and known modem behavior, and the measured SNR is reported by a modem.
3. A computer-readable information storage media having stored thereon instructions that, if executed, cause comparing of a modeled SNR with a measured SNR for a given link, wherein the modeled SNR is derived from one or more of the measured HLOG, measured QLN, transmit PSD, DSL standard, link parameters, and known modem behavior, and the measured SNR is reported by a modem.
4. Aspect 1 or 2 or 3, wherein the modeled SNR is derived from one or more of an attenuation measurement, a noise measurement, knowledge about the link parameters such as transmitted PSD, and the behavior of the modems.

5. Aspect 1 or 2 or 3, wherein the modeled SNR is derived approximately by one or more of neglecting or assuming approximate values for attenuation, noise, link parameters, and/or behavior of the modems.
6. Aspect 1 or 2 or 3, wherein the measured SNR is derived from one or more of the bit allocations, fine gains, and average SNR margin.
7. A module capable of detecting the presence of a fault by comparing the modeled data rate with the measured data rate for a given link, wherein the modeled data rate is derived from one or more of the measured HLOG, measured QLN, transmit PSD, DSL standard, link parameters, and known modem behavior, and the measured data rate is reported by a modem.
8. A method of detecting the presence of a fault comprising: comparing the modeled data rate with the measured data rate for a given link, wherein the modeled data rate is derived from one or more of the measured HLOG, measured QLN, transmit PSD, DSL standard, link parameters, and known modem behavior, and the measured data rate is reported by a modem.
9. A computer-readable information storage media having stored thereon instructions that, if executed, cause comparing of a modeled data rate with a measured data rate for a given link, wherein the modeled data rate is derived from one or more of the measured HLOG, measured QLN, transmit PSD, DSL standard, link parameters, and known modem behavior, and the measured data rate is reported by the modem.
10. Aspect 7 or 8 or 9, wherein the modeled data rate is derived from an attenuation measurement, a noise measurement, knowledge about the link parameters such as transmitted PSD, and the behavior of the modems.
11. Aspect 7 or 8 or 9, wherein the modeled data rate is derived approximately by one or more of neglecting or assuming approximate values for attenuation, noise, link parameters, and/or behavior of the modems.
12. A module capable of detecting the presence of a fault by determining the significance of the additive noise apparently attributable to the fault relative to the other known noises, wherein the apparent fault noise is derived from one or more of the measured SNR, measured HLOG, measured QLN, transmit PSD, DSL standard, link parameters, and known modem behavior.
13. A method of detecting the presence of a fault comprising: determining the significance of the additive noise apparently attributable to the fault relative to the other known noises, wherein the apparent fault noise is derived from one or more of the measured SNR, measured HLOG, measured QLN, transmit PSD, DSL standard, link parameters, and known modem behavior.
14. A computer-readable information storage media having stored thereon instructions that, if executed, cause determining of the significance of the additive noise apparently attributable to the fault relative to the other known noises, wherein the apparent fault noise is derived from one or more of the measured SNR, measured HLOG, measured QLN, transmit PSD, DSL standard, link parameters, and known modem behavior.
15. Aspect 12 or 13 or 14, wherein the apparent fault noise is derived from one or more of an SNR measurement, attenuation measurement, a noise measurement, knowledge about the link parameters such as transmitted PSD, and the behavior of the modems.
16. Aspect 12 or 13 or 14, wherein the apparent fault noise is derived approximately by one or more of neglecting or assuming approximate values for SNR, attenuation, noise, link parameters, and/or behavior of the modems.
17. Aspect 12 or 13 or 14, wherein the measured SNR is derived from one or more of the bit allocations, fine gains, and average SNR margin.
18. A module capable of detecting the presence of a fault by determining the significance of the attenuation apparently attributable to the fault, wherein the apparent fault attenuation is derived from one or more of the measured SNR, measured HLOG, measured QLN, transmit PSD, DSL standard, link parameters, and known modem behavior.
19. A method of detecting the presence of a fault comprising: determining the significance of the attenuation apparently attributable to the fault, wherein the apparent fault attenuation is derived from one or more of the measured SNR, measured HLOG, measured QLN, transmit PSD, DSL standard, link parameters, and known modem behavior.
20. A computer-readable information storage media having stored thereon instructions that, if executed, cause determining of the significance of the attenuation apparently attributable to the fault, wherein the apparent fault attenuation is derived from one or more of the measured SNR, measured HLOG, measured QLN, transmit PSD, DSL standard, link parameters, and known modem behavior.
21. Aspect 18 or 19 or 20, wherein the apparent fault attenuation is derived from one or more of an attenuation measurement, a noise measurement, knowledge about the link parameters such as transmitted PSD, and the behavior of the modems.
22. Aspect 18 or 19 or 20, wherein the apparent fault attenuation is derived approximately by one or more of neglecting or assuming approximate values for attenuation, noise, link parameters, and/or behavior of the modems.
23. Aspect 18 or 19 or 20, wherein the measured SNR is derived from one or more of the bit allocations, fine gains, and average SNR margin.
24. A module capable of detecting the presence of a fault by determining the significance of the noise emphasis apparently attributable to the fault, wherein the apparent fault noise emphasis is derived from one or more of the measured SNR, measured HLOG, measured QLN, transmit PSD, DSL standard, link parameters, and known modem behavior.
25. A method of detecting the presence of a fault comprising: determining the significance of the noise emphasis apparently attributable to the fault, wherein the apparent fault noise emphasis is derived from one or more of the measured SNR, measured HLOG, measured QLN, transmit PSD, DSL standard, link parameters, and known modem behavior.
26. A computer-readable information storage media having stored thereon instructions that, if executed, cause the determining of the significance of the noise emphasis apparently attributable to the fault, wherein the apparent fault noise emphasis is derived from one or more of the measured SNR, measured HLOG, measured QLN, transmit PSD, DSL standard, link parameters, and known modem behavior.
27. Aspect 18 or 19 or 20, wherein the apparent fault noise emphasis is derived from one or more of an attenuation measurement, a noise measurement, knowledge about the link parameters such as transmitted PSD, and the behavior of the modems.
28. Aspect 18 or 19 or 20, wherein the apparent fault noise emphasis is derived approximately by one or more of neglecting or assuming approximate values for attenuation, noise, link parameters, and/or behavior of the modems.

29. Aspect 18 or 19 or 20, wherein the measured SNR is derived from one or more of the bit allocations, fine gains, and average SNR margin.
30. Any of the aspects above wherein a user is notified of the detection of a non-linear device.
31. Any of the aspects above wherein additional links are performed to identify additional non-linear devices.

One exemplary embodiment of the proposed method can utilize standard compliant data collection. This includes ITU and ANSI DSL standards. Because it is possible (although not necessary) to utilize standard-compliant DSL links to acquire the data rather than relying on a proprietary implementation that might not be implemented on some modems, more modems can utilize the proposed method because the vast majority of DSL modems are effectively standard compliant.

One exemplary embodiment of the proposed method can utilize standard compliant sending of data from the far-end modem to the central office, which enables data collection to be initiated and results made available remotely (e.g., from a central office far from the CPE modem and unfiltered devices) without requiring a commutations channel other than the DSL link itself used to perform the measurement.

These and other features and advantages of this invention are described in, or are apparent from, the following detail description of the exemplary embodiments.

BRIEF DESCRIPTION OF THE DRAWINGS

The exemplary embodiments of the invention will be described in detail, with reference to the following figures, wherein.

DETAILED DESCRIPTION

Figure 1A:
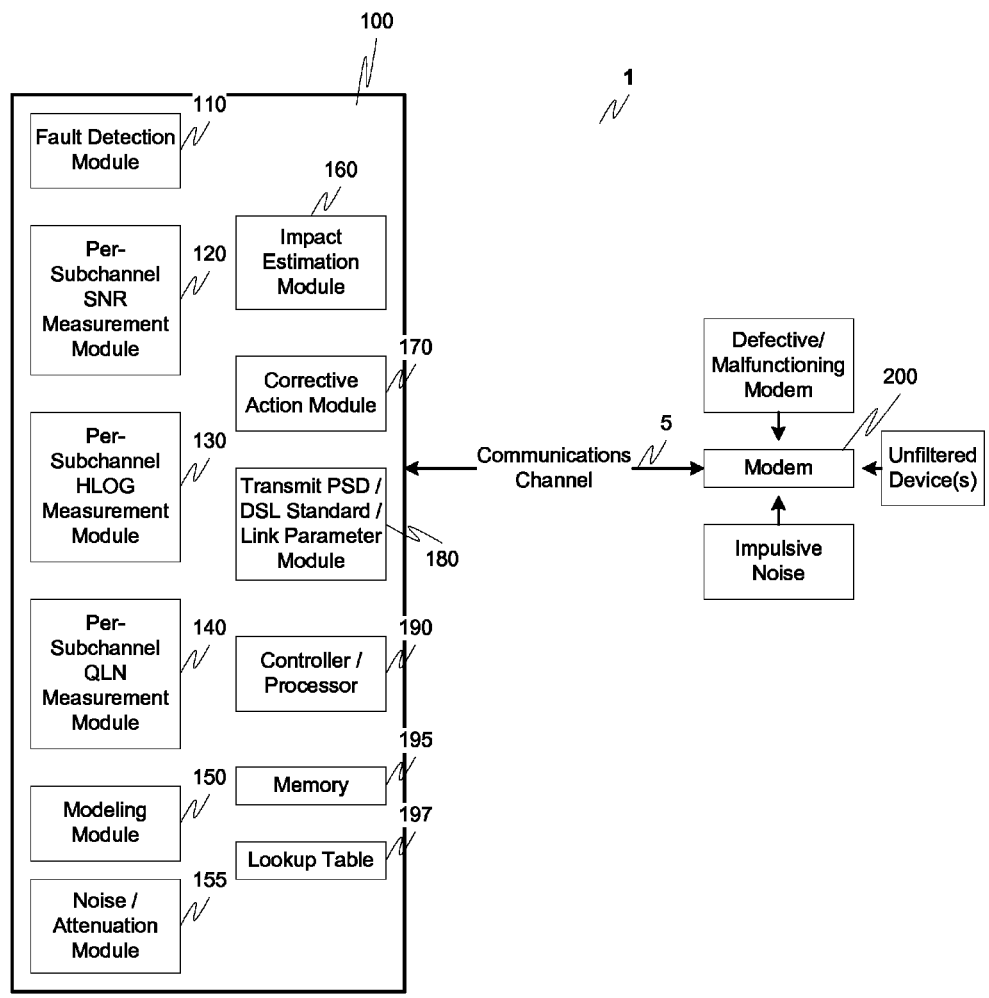
FIG. 1A illustrates an exemplary communications system according to this invention.

The exemplary embodiments of this invention will be described in relation to communications systems, as well as protocols, techniques and methods to identify faults and/or impairments in a multicarrier communications environment. However, it should be appreciated, that in general, the systems and methods of this invention will work equally well for other types of communications environments, networks and/or protocols.

The exemplary systems and methods of this invention will also be described in relation to multicarrier wired or wireless modems, such as powerline modems, coaxial cable modems, telephone line modems, such as xDSL modems and vDSL modems, wireless modems, such as 802.11 and 802.16 modems, and associated communications hardware, software and communications channels. However, to avoid unnecessarily obscuring the present invention, the following description omits well-known structures and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured, and/or encrypted system.

Thus, it should be appreciated that the components of the system can be combined into one or more devices, such as a modem, line card, a station, a domain master, a node or collocated on a particular node of a distributed network, such as a telecommunications network. As will be appreciated from the following description, and for reasons of computations efficiency, the components of the systems can be arranged at any location within a distributed network without affecting the operation thereof. For example, the various components can be located in a domain master, a node, a domain management device, or some combination thereof. Similarly, one or more functional portions of this system could be distributed between a modem and an associated computing device/system.

Furthermore, it should be appreciated that the various links, including the communications channels connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute, and variations thereof, as used herein are used interchangeably and include any type of methodology, process, technique, mathematical operation or protocol. The terms transceiver and modem are also used interchangeably herein. The terms transmitting modem and transmitting transceiver as well as receiving modem and receiving transceiver are also used interchangeably herein. The term DSL is used in this description for any type of xDSL including ADSL1, ADSL2/2+, VDSL2. G.inp, etc. The term link is used in this description for any type of xDSL data connection between two xDSL transceivers. The term Management Interface is used in this description for any type of interface between a management entity and/or technician and a transceiver, such as, for example, a CO-MIB or CPE-MIB as described in ITU Standard G.997.1.

Moreover, while some of the exemplary embodiments described are directed toward a transmitter portion of a transceiver performing certain functions, this disclosure is intended to include corresponding receiver-side functionality in both the same transceiver and/or another transceiver and vice versa.

Certain exemplary embodiments of this invention also relate to multi-carrier communications links, such as Discrete Multi-Tone (DMT). Also, the terms transceiver and modem have the same meaning and are used herein interchangeably.

FIG. 1A illustrates an exemplary communications system 1. The communications system 1 includes modems 100 and 200 communicating over communications channel 5. In addition to well known componentry, the modem 100 includes a fault detection module 110, a per-subchannel SNR measurement module 120, a per-subchannel HLOG measurement module 130, a per-subchannel QLN measurement module 140, a modeling module 150, noise/attenuation module 155, an impact estimation module 160, a corrective action module 170, a transmit PSD/DSL standard/link parameter module 180, controller 190, memory 195, lookup table 197, in addition to other well known componentry. The modem 200 can include similar componentry.

Figure 1B:
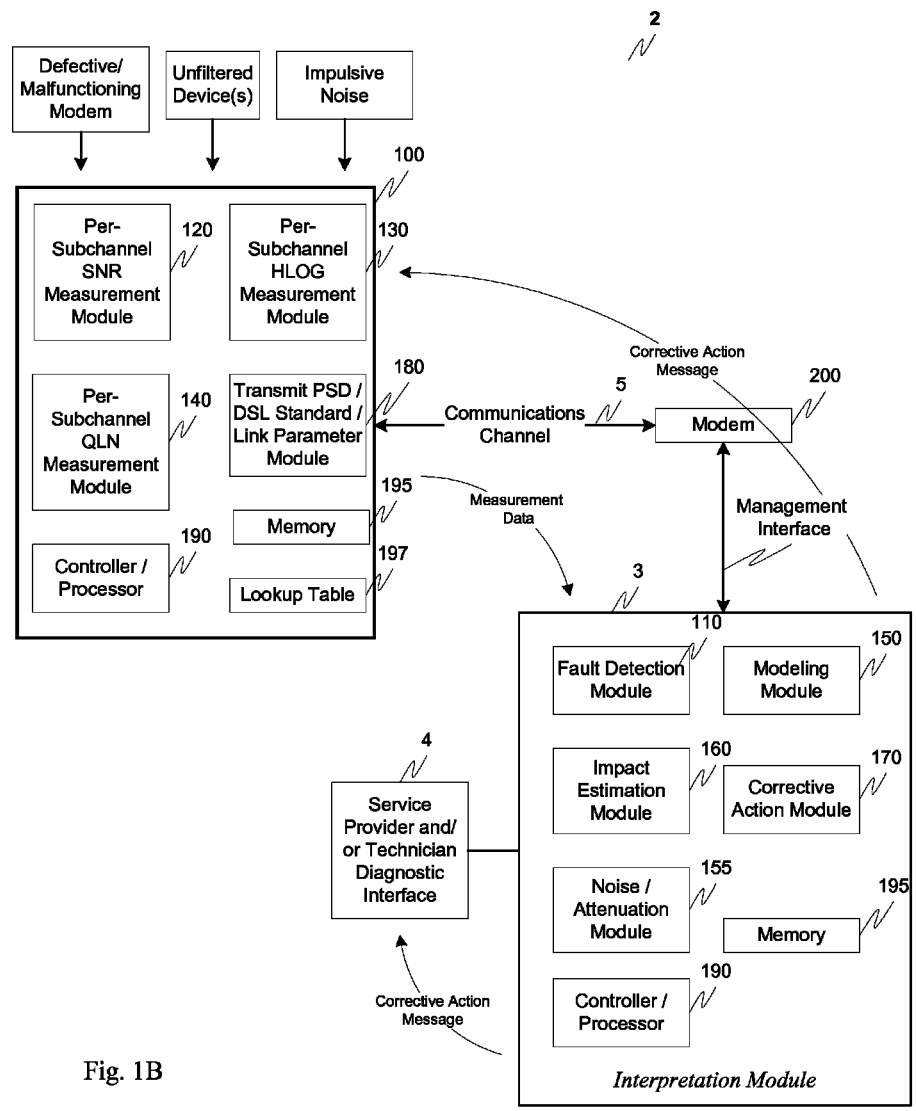
FIG. 1B illustrates a second exemplary communications system that includes a diagnostic interface according to this invention.

FIG. 1B illustrates a second exemplary embodiment of the invention where like numbers have been used for like parts, however certain functionality has been moved to an interpretation module 3. More specifically, the communications system 2 includes modems 100 and 200 communicating over communications channel 5. The communications system 2 also includes an interpretation module 3, connected via the management interface, to modem 200. The interpretation module 3 is further connected to a service provider and/or technician diagnostic interface 4. Similar to FIG. 1A, the modem 100 includes a per-subchannel SNR measurement module 120, a per-subchannel HLOG measurement module 130, a per-subchannel QLN measurement module 140, controller/processor 190, a transmit PSD/DSL standard/link parameter module 180, controller 190, memory 195 and lookup table 197, in addition to other well known componentry. The interpretation module 3 includes a fault detection module 110, a modeling module 150, noise/attenuation module 155, an impact estimation module 160, a corrective action module 170 as well as a controller 190 and a memory 195. Instead of the modem 100 performing the interpretation functionality to determine the presence of one or more faults as in the embodiment in FIG. 1A, in the embodiment of FIG. 1B, the measurement data obtained by modem 100 is forwarded to the interpretation module 3. More specifically, the interpretation module 3 receives measurement data from modem 100, and more specifically from the per-subchannel SNR measurement module 120, the per-subchannel HLOG measurement module 130, and the per-subchannel QLN measurement module 140 (via communications channel 5 and modem 200) and is capable of returning a corrective action message to more or more of the modem 100 (via communications channel 5 and modem 200) and the service provider/technician at the diagnostic interface 4.

In accordance with an exemplary embodiment, the modems can affected by one or more faults and/or impairments, such as a defective or malfunctioning modem, one or more unfiltered devices, and impulse noise.

As discussed, unlike other faults such as high crosstalk, AM ingress, and bridged taps, the presence of one or more unfiltered devices, the presence of impulsive noise, and a malfunctioning modem are not always identifiable by doing a separate analyses of the attenuation (HLOG) and quiet line noise (QLN) vectors as a function of frequency (per subchannel) that are available as a part of standard-compliant DSL links. An exemplary aspect of this invention is directed toward detecting the presence of one or more faults, generating a corrective action message and optionally estimating the rate impact of the detected fault(s).

More specifically, and in general, the fault detection module 110 works with one or more of the per-subchannel SNR measurement module 120, the per-subchannel HLOG measurement module 130, and the per-subchannel QLN measurement module 140 to detect the presence of one or more faults. These modules can further cooperate with the modeling module 150 in those instances where modeled attributes are also taken into consideration to assists with determining fault or impairment presence. Then, the corrective action module 170 generates and forwards a message to, for example, a user, service provider and/or technician recommending corrective action. This process of fault detection and corrective action recommendations can be performed iteratively as needed.

In operation, the modem 100 initiates a link with modem 200 over communications channel 5. In cooperation with the SNR measurement module 120, the measured per-subchannel SNRs are measured. As an alternative, a technician can initiate a link from the diagnostic interface 4.

In addition, and in cooperation with the HLOG measurement module 130, per-subchannel HLOG is measured and recorded. In conjunction with the QLN measurement module 140, the per-subchannel QLN is also measured and recorded. Additionally, and in cooperation with the link parameter module 180 and lookup table 197, link information such as transmit PSD, DSL standard, link parameters, and the like can also be determined and/or recorded and, for example, stored in memory 195 and/or the lookup table 197. This information can also be forwarded, as discussed above in relation to communications system 2, to the interpretation module 3.

In accordance with a first exemplary embodiment, and in cooperation with the modeling module 150, a modeled per-subchannel SNR is determined from the measured HLOG, measured QLN, transmit PSD, and known modem behavior. Then, in cooperation with the fault detection module 110, the measured SNR and the modeled SNR are compared over the range of subchannels that are known to be sufficiently accurate. A determination is then made by the fault detection module 110 whether any of the detectable fault types are present. The corrective action module 170 can then assemble and report whether a fault is detected, a fault is known not to be present, or whether a determination could not be made.

Optionally, or in addition, with the impact estimation module 160, the attainable data rate from the measured SNR can be subtracted from the attainable data rate determined from the modeled SNR, resulting in the rate impact from the fault that was detected. As discussed, these rate estimates can be determined using any one of several link assumptions including the actual link parameters used to obtain the measured SNRs. In fact, the actual link data rate could be used directly instead of determining the data rate from the measured SNRs. This rate impact from the fault can be reported to the user.

A second exemplary embodiment includes a majority of the steps as discussed above, however it is based on additive noise instead of the modeled per-subchannel SNR. More specifically, and in cooperation with the noise module 155, the additive noise apparently attributable to the fault from the measured per-subchannel SNR, measured HLOG, measured QLN, transmit PSD and known modem behavior is determined. Then, by considering the magnitude of the FaultNoise relative to the other noises (QLN+IntrinsicNoise), a determination is made regarding whether the detectable fault types are present. Then, in cooperation with the corrective action model, a report can be generated as to whether a fault is detected, a fault is known not to be present or whether a determination could not be made.

A third exemplary embodiment utilizes an attenuation measurement to assist with the determining fault presence. More specifically, and in cooperation with the attenuation module 155, the attenuation apparently attributable to the fault is determined from the measured per-subchannel SNR from the measured HLOG, measured QLN, transmit PSD and known modem behavior. Then, when considering the magnitude of the FaultAttenuation, a determination is made regarding whether the detectable type faults are present. A report can then be generated in cooperation with the corrective action module 170 as discussed above.

A fourth exemplary embodiment utilizes Noise Amplification to assist with determining fault presence. More specifically, and in cooperation with the noise module 155, noise amplification apparently attributable to the fault is determined from the measured per-subchannel SNR from measured HLOG, measured QLN, transmit PSD and known modem behavior. By considering the magnitude of the NoiseAmplification, a determination is made regarding whether the detectable type faults listed above are present. As with the other embodiments, the corrective action module 170 can compile and forward a report regarding the fault(s) detected, with the impact estimation module 160 optionally estimating any impact the fault(s) may be causing.

Figures 2, 3:
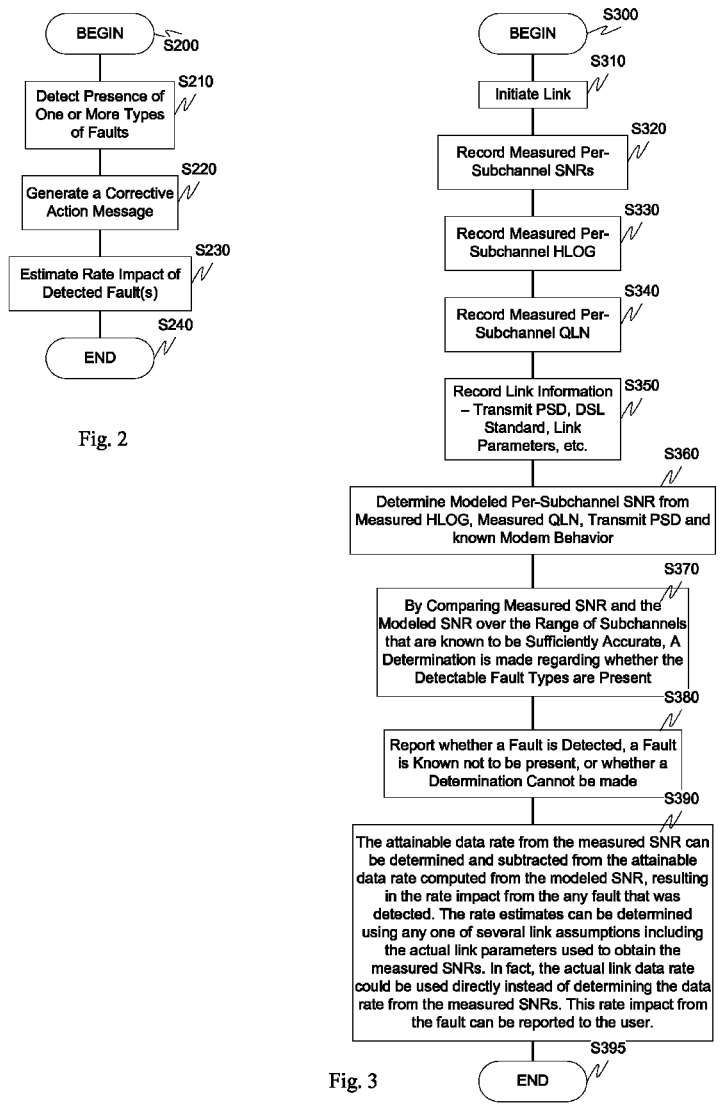
FIG. 2 illustrates an exemplary method of detecting and correcting faults according to this invention.
FIG. 3 illustrates an exemplary method of fault detection based on SNR according to this invention.

FIG. 2 outlines an exemplary high level overview of an exemplary embodiment of this invention. In particular, control begins in step S200 and continues to step S210. In step S210, the presence of one or more faults is detected. Next, in step S220, a corrective action message is generated. Then, in step S230, the rate impact of the detected fault(s) can optionally be estimated. Control then continues to step S240 where the control sequence ends.

FIG. 3 outlines a first exemplary embodiment for fault detection according to this invention. In particular, control begins in step S300 and continues to step S310. In step S310 a link is initiated between the two modems over the communications channel. As discussed, this link could also be initiated at the direction of a technician or service provider via the management interface. Next, in step S320, the per-subchannel SNRs are measured and recorded. Then, in step S330, the per-subchannel HLOG is measured and recorded. Control then continues to step S340.

In step S340, the per-subchannel QLN is measured and recorded. Next, in step S350, link information, such as transmit PSD, DSL standard, link parameters, and the like can also be recorded. Control then continues to step S360. As discussed above, in accordance with the embodiment of FIG. 1B, this information can be forwarded to or requested by a technician or service provider associated with the diagnostic interface.

In step S360, the modeled per-subchannel SNR is determined from the measured HLOG, measured QLN, transmit PSD and known modem behavior. Then, step S370, by comparing the measured SNR and the modeled SNR over the range of subchannels that are known to be sufficiently accurate, a determination is made regarding whether the detectable fault types are present. Control then continues to step S380.

In step S380, a report is generated and optionally forwarded to, for example, one or more of a user, technician and service provider, whether a fault has been detected, a fault is known not be present or whether a determination cannot be made. Then, in step S390, the attainable data rate from the measured SNR can optionally be determined and subtracted from the attainable data rate computed from the modeled SNR resulting in the rate impact from any fault that was detected. The rate estimates can be determined using any one of several link assumptions including the actual link parameters used to obtain the measured SNRs. In fact, the actual data link rate could be used directly instead of determining the data rate from the measured SNRs. This rate impact from the fault can be reported to the one or more of a user, technician and service provider. Control then continues to step S395 where the control sequence ends.

Figure 4:
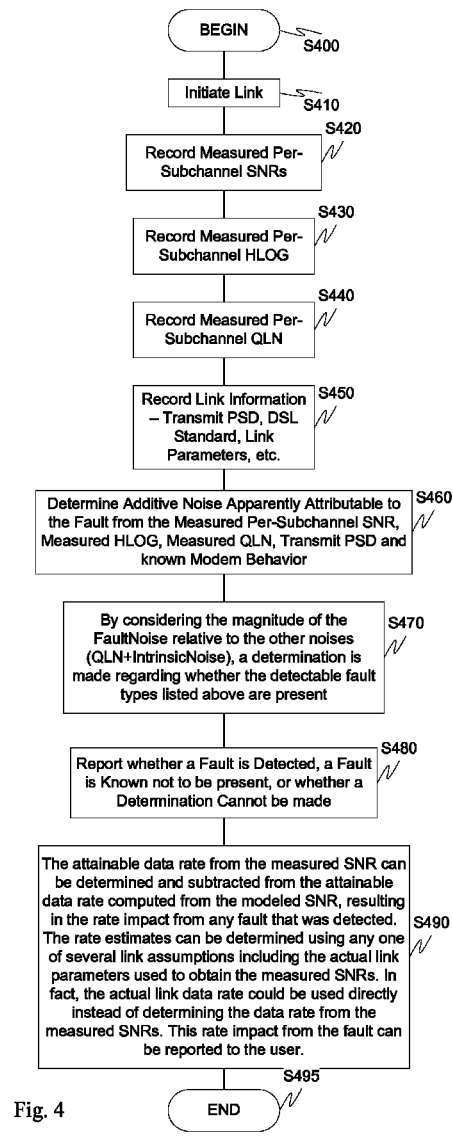
FIG. 4 illustrates an exemplary method of fault detection based on additive noise according to this invention.

FIG. 4 outlines a second exemplary embodiment for fault detection according to this invention. In particular, control begins in step S400 and continues to step S410. In step S410 a link is initiated between the two modems over the communications channel. As discussed, this link could also be initiated at the direction of a technician or service provider via the management interface. Next, in step S420, the per-subchannel SNRs are measured and recorded. Then, in step S430, the per-subchannel HLOG is measured and recorded. Control then continues to step S440.

In step S440, the per-subchannel QLN is measured and recorded. Next, in step S450, link information, such as transmit PSD, DSL standard, link parameters, and the like can also be recorded. Control then continues to step S460. As discussed above, in accordance with the embodiment of FIG. 1B, this information can be forwarded to or requested by a technician or service provider associated with the diagnostic interface.

In step S460, the Additive Noise apparently attributable to the fault is determined from the measured per-subchannel SNR from measured HLOG, measured QLN, transmit PSD and known modem behavior. Then, step S470, by comparing the magnitude of the FaultNoise relative to the other noises (QLN+IntrinsicNoise), a determination is made regarding whether the detectable fault types listed above are present. Control then continues to step S480.

In step S480, a report is generated and optionally forwarded to, for example, one or more of a user, technician and service provider, whether a fault is known not be present or whether a determination cannot be made. Then, in step S490, the attainable data rate from the measured SNR can optionally be determined and subtracted from the attainable data rate computed from the modeled SNR resulting in the rate impact from any fault that was detected. The rate estimates can be determined using any one of several link assumptions including the actual link parameters used to obtain the measured SNRs. In fact, the actual data link rate could be used directly instead of determining the data rate from the measured SNRs. This rate impact from the fault can be reported to one or more of a user, technician and service provider. Control then continues to step S495 where the control sequence ends.

Figure 5:
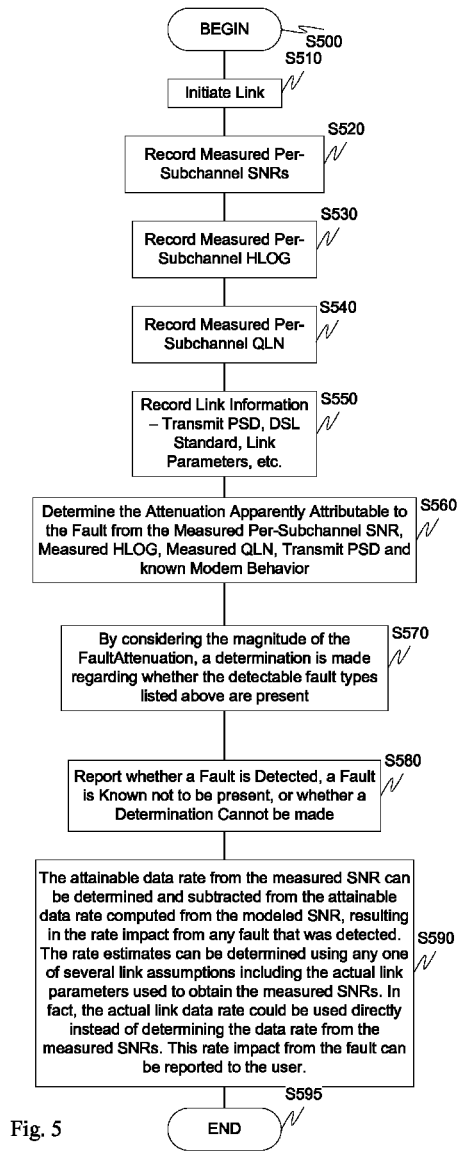
FIG. 5 illustrates an exemplary method of fault detection based on attenuation according to this invention.

FIG. 5 outlines a third exemplary embodiment for fault detection according to this invention. In particular, control begins in step S500 and continues to step S510. In step S510 a link is initiated between the two modems over the communications channel. As discussed, this link could also be initiated at the direction of a technician or service provider via the management interface. Next, in step S520, the per-subchannel SNRs are measured and recorded. Then, in step S530, the per-subchannel HLOG is measured and recorded. Control then continues to step S540.

In step S540, the per-subchannel QLN is measured and recorded. Next, in step S550, link information, such as transmit PSD, DSL standard, link parameters, and the like can also be recorded. Control then continues to step S560. As discussed above, in accordance with the embodiment of FIG. 1B, this information can be forwarded to or requested by a technician or service provider associated with the diagnostic interface.

In step S560, the attenuation apparently attributable to the fault(s) from the measured per-subchannel SNR, measured HLOG, measured QLN, transmit PSD and known modem behavior. Then, step S570, by evaluating the magnitude of the FaultAttenuation, a determination is made regarding whether the detectable fault types listed above are present. Control then continues to step S580.

In step S580, a report is generated and optionally forwarded to, for example, one or more of a user, technician and service provider, whether a fault is known not be present or whether a determination cannot be made. Then, in step S590, the attainable data rate from the measured SNR can optionally be determined and subtracted from the attainable data rate computed from the modeled SNR resulting in the rate impact from any fault that was detected. The rate estimates can be determined using any one of several link assumptions including the actual link parameters used to obtain the measured SNRs. In fact, the actual data link rate could be used directly instead of determining the data rate from the measured SNRs. This rate impact from the fault can be reported to one or more of a user, technician and service provider. Control then continues to step S595 where the control sequence ends.

Figure 6:
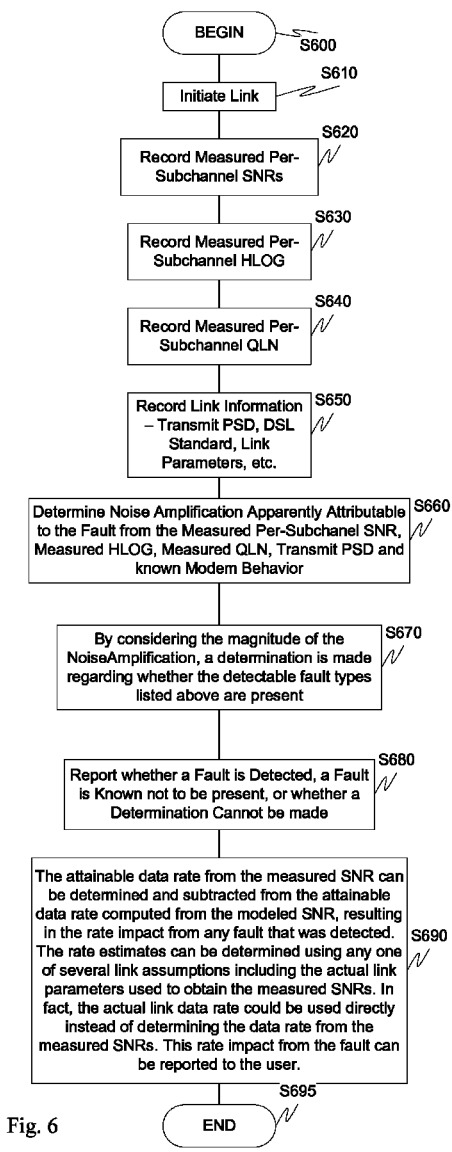
FIG. 6 illustrates an exemplary method of fault detection based on noise amplification according to this invention.

FIG. 6 outlines a fourth exemplary embodiment for fault detection according to this invention. In particular, control begins in step S600 and continues to step S610. In step S610 a link is initiated between the two modems over the communications channel. As discussed, this link could also be initiated at the direction of a technician or service provider via the management interface. Next, in step S620, the per-subchannel SNRs are measured and recorded. Then, in step S630, the per-subchannel HLOG is measured and recorded. Control then continues to step S640.

In step S640, the per-subchannel QLN is measured and recorded. Next, in step S650, link information, such as transmit PSD, DSL standard, link parameters, and the like can also be recorded. Control then continues to step S660. As discussed above, in accordance with the embodiment of FIG. 1B, this information can be forwarded to or requested by a technician or service provider associated with the diagnostic interface.

In step S660, the Noise Amplification apparently attributable to the Fault is determined from the measured per-subchannel SNR from measured HLOG, measured QLN, transmit PSD and known modem behavior. Then, step S350, by evaluating the magnitude of the NoiseAmplification, a determination is made regarding whether the detectable fault types are present. Control then continues to step S680.

In step S680, a report is generated and optionally forwarded to, for example, one or more of a user, technician and service provider, whether a fault is known not be present or whether a determination cannot be made. Then, in step S690, the attainable data rate from the measured SNR can optionally be determined and subtracted from the attainable data rate computed from the modeled SNR resulting in the rate impact from any fault that was detected. The rate estimates can be determined using any one of several link assumptions including the actual link parameters used to obtain the measured SNRs. In fact, the actual data link rate could be used directly instead of determining the data rate from the measured SNRs. This rate impact from the fault can be reported to one or more of a user, technician and service provider. Control then continues to step S695 where the control sequence ends.

Figure 7:
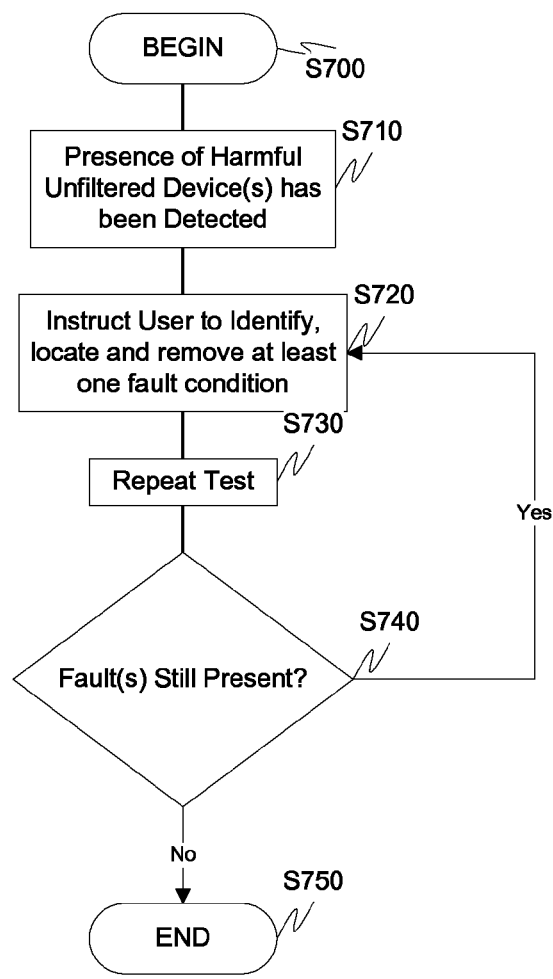
FIG. 7 is a flowchart illustrating an exemplary iterative approach to detecting faults according to this invention.

FIG. 7 outlines an exemplary embodiment of iteratively correcting faults according to an exemplary embodiment of this invention. In particular, control begins in step S700 and continues to step S710. In step S710, the presence of harmful unfiltered device(s) has been detected. Next, in step S720, the user is instructed to identify, locate, and remove at least one fault condition. For example, a report or message can be sent to one or more of a user, technician and service provider, it may or may not include graphical illustrations of what to look for in terms of common fault causing devices that should either be removed from the circuit, or, for example, a microfilter installed between the device(s) and the communications channel. This report or message could be displayed on a display associated with a computer connected to the modem or the diagnostic interface.

Once the user has located and removed at least one fault condition, control continues to step S730 where one or more of the tests above can be repeated. Then, in step S740, a determination is made whether the fault(s) are still present. If the fault(s) are present, control jumps back to step S720 with control otherwise continuing to step S750 where the control sequence ends.

The above-described methods and systems and can be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug® transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug® or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this invention. While the systems and means disclosed herein are described in relation to various functions that are performed, it is to be appreciated that the systems and means may not always perform all of the various functions, but are capable of performing one or more of the disclosed functions.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a computer-readable storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of communication device.

While the invention is described in terms of exemplary embodiments, it should be appreciated that individual aspects of the invention could be separately claimed and one or more of the features of the various embodiments can be combined.

While the systems and means disclosed herein are described in relation to various functions that are performed, it is to be appreciated that the systems and means may not always perform all of the various functions, but are capable of performing one or more of the disclosed functions.

While the exemplary embodiments illustrated herein disclose the various components as collocated, it is to be appreciated that the various components of the system can be located at distant portions of a distributed network, such as a telecommunications network and/or the Internet or within a dedicated communications network. Thus, it should be appreciated that the components of the system can be combined into one or more devices or collocated on a particular node of a distributed network, such as a telecommunications network. As will be appreciated from the following description, and for reasons of computational efficiency, the components of the communications network can be arranged at any location within the distributed network without affecting the operation of the system.

It is therefore apparent that there has been provided, in accordance with the present invention, systems and methods for fault and impairment detection and mitigation. While this invention has been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this invention.

The invention claimed is:

1. A system adapted to detect one or more faults affecting a communication channel comprising:
    an interpretation module capable of receiving, via a management interface, one or more of per-subchannel SNR's (Signal-to-Noise Ratio), per-subchannel attenuation analysis (HLOG), per-subchannel quiet line noise (QLN) and information about the communication channel; and
    a fault detection module and processor capable of determining a presence of a fault that impacts SNR on the communication channel from one or more of the HLOG, QLN, transmit power spectral density (PSD) and knowledge about behavior of a modem that can be calibrated in advance.

2. The system of claim 1, further comprising a corrective action module capable of generating a report indicating whether the fault has been detected, the fault is known not to be present, or whether a determination cannot be made.

3. The system of claim 2, wherein the report is forwarded to one or more of a user, technician and service provider.

4. The system of claim 1, further comprising a modeling module capable of determining a modeled per-subchannel SNR.

5. The system of claim 4, wherein the presence of the fault is determined when a difference between the modeled SNR and a measured SNR exceeds a threshold.

6. The system of claim 1, further comprising a noise module capable of determining additive noise attributable to one or more faults.

7. The system of claim 1, further comprising an attenuation module capable of determining attenuation attributable to one or more faults.

8. The system of claim 1, further comprising a noise module capable of determining noise amplification attributable to one or more faults.

9. A system adapted to detect a presence of one or more faults comprising:
    a modeling module and processor capable of comparing a modeled Signal-to-Noise Ratio (SNR), with a measured SNR for a given link, wherein the modeled SNR is derived from measured per-subchannel attenuation analysis (HLOG), measured per-subchannel quiet line noise (QLN), transmit power spectral density (PSD), digital subscriber line (DSL) standard information, link parameters, and knowledge about behavior of a modem that can be calibrated in advance; and
    an interpretation module capable of receiving, via a management interface, the measured SNR.

10. The system of claim 9, wherein a presence of a fault is determined when a difference between the modeled SNR and the measured SNR exceeds a threshold.

11. A system to detect a presence of one or more faults comprising:
    a modeling module and processor capable of comparing a modeled data rate with a measured data rate for a given link, wherein the modeled data rate is derived from measured per-subchannel attenuation analysis (HLOG), measured per-subchannel quiet line noise (QLN), transmit power spectral density (PSD), digital subscriber line (DSL) standard information, link parameters, and knowledge about behavior of a modem that can be calibrated in advance; and
    an interpretation module capable of receiving, via a management interface, the measured data rate.

12. A system adapted to detect a presence of one or more faults comprising:
    a noise module capable of determining a significance of additive noise attributable to the one or more faults relative to other known noises, wherein fault noise is derived from measured Signal-to-Noise Ratio (SNR), measured per-subchannel attenuation analysis (HLOG), measured per-subchannel quiet line noise (QLN), transmit power spectral density (PSD), digital subscriber line (DSL) standard information, link parameters, and knowledge about behavior of a modem that can be calibrated in advance.

13. A system adapted to detect a presence of one or more faults comprising:
    an attenuation module and processor capable of determining a significance of attenuation attributable to the one or more faults, wherein the attenuation is derived from measured Signal-to-Noise Ratio (SNR), measured per-subchannel attenuation analysis (HLOG), measured per-subchannel quiet line noise (QLN), transmit power spectral density (PSD), digital subscriber line (DSL) standard information, link parameters, and knowledge about behavior of a modem that can be calibrated in advance.

14. A system adapted to detect a presence of one or more faults comprising:

a noise module capable of determining a significance of noise emphasis attributable to the one or more faults, wherein the fault noise emphasis is derived from measured Signal-to-Noise Ratio (SNR), measured per-subchannel attenuation analysis (HLOG), measured per-subchannel quiet line noise (QLN), transmit power spectral density (PSD), digital subscriber line (DSL) standard information, link parameters, and knowledge about behavior of a modem that can be calibrated in advance.

* * * * *